United States Patent [19]

Bischoff et al.

[11] Patent Number: 4,932,275
[45] Date of Patent: Jun. 12, 1990

[54] ARRANGEMENT FOR THE FIXATION OF A BRAKE POWER BOOSTER

[75] Inventors: Gilbert Bischoff, Hattersheim; Wolfgang Kirchner, Eschborn; Uwe Kley, Frankfurt am Main, all of Fed. Rep. of Germany

[73] Assignee: Alfred Teves GmbH, Frankfurt am Main, Fed. Rep. of Germany

[21] Appl. No.: 308,230

[22] Filed: Feb. 8, 1989

[30] Foreign Application Priority Data

Feb. 10, 1988 [DE] Fed. Rep. of Germany ....... 3803958

[51] Int. Cl.$^5$ .............................................. F16J 15/50
[52] U.S. Cl. ........................................ 74/18.2; 92/168
[58] Field of Search .............. 74/18.2; 92/161, 165 R, 92/168

[56] References Cited

U.S. PATENT DOCUMENTS 2,843,419  7/1958  Wilfert .
3,026,853  3/1962  Stelzer .
3,068,842  12/1962  Brooks .
3,646,758  3/1972  Cripe .
4,269,533  5/1981  Mashiki et al. .
4,353,430  10/1982  Sjoqvist et al. .
4,567,728  2/1986  Ohmi et al. ...................... 92/168 X Primary Examiner—Joseph Falk
Attorney, Agent, or Firm—Robert P. Seitter

[57] ABSTRACT

An arrangement for mounting a brake power booster to the mud guard of an automotive vehicle. The booster is actuated by means of a push rod. An adapter which partly surrounds the booster housing is arranged between the brake power booster and the mud guard. To eliminate the engine and suction noises of the brake power booster which have a disturbing effect in the passenger compartment of the automotive vehicle and to simultaneously seal the passenger compartment, the adapter presents a ventilation port and a seal is provided between the adapter and the mud guard which is simultaneously brought in abutment against the push rod as a radial seal.

6 Claims, 2 Drawing Sheets

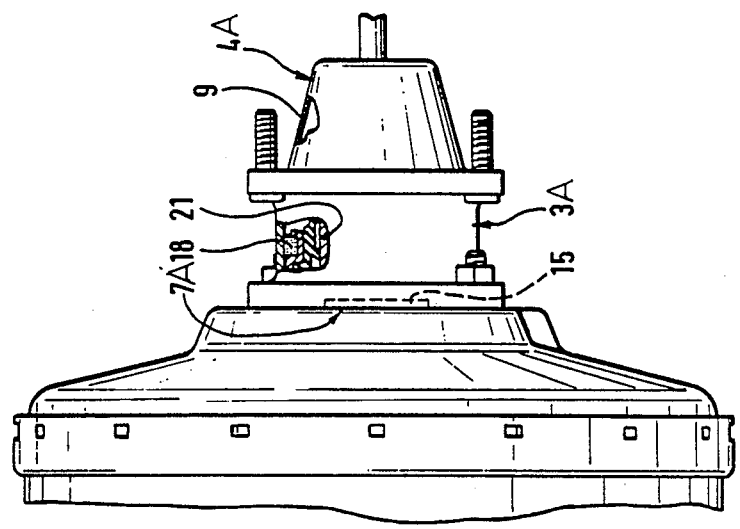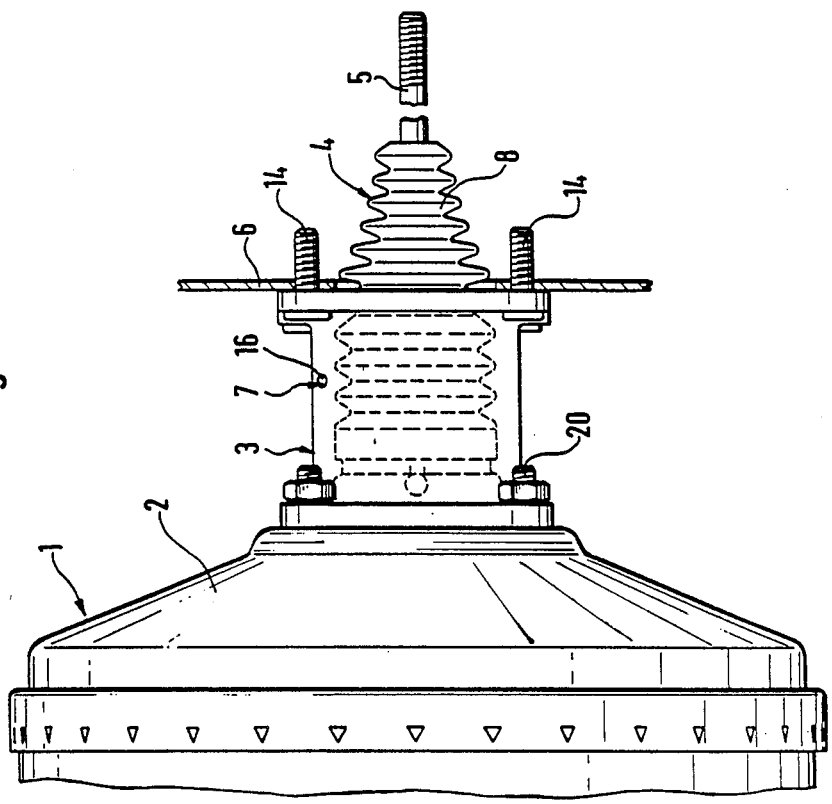

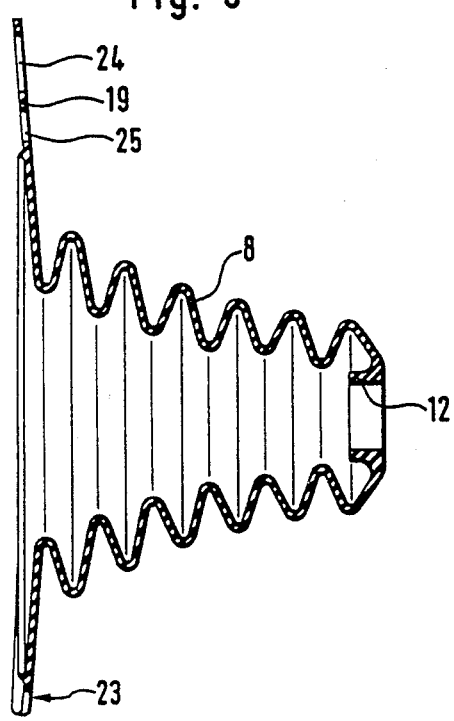
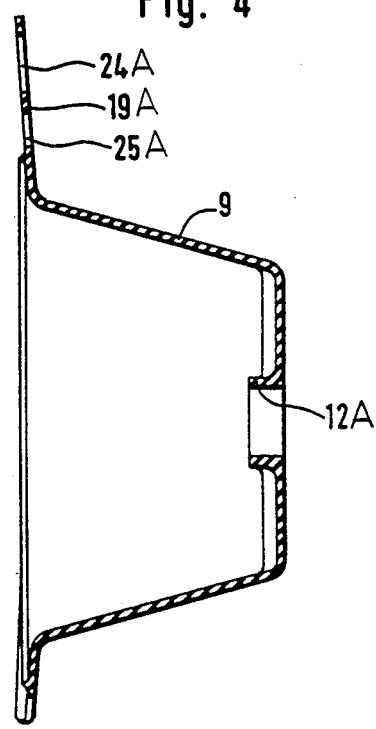
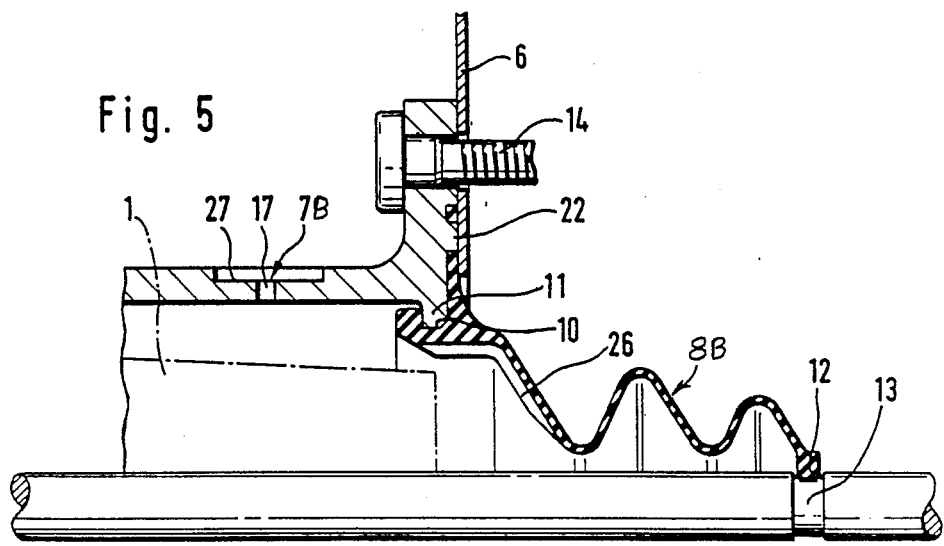

ARRANGEMENT FOR THE FIXATION OF A BRAKE POWER BOOSTER

BACKGROUND OF THE INVENTION

This invention relates to an arrangement for the fixation or mounting of a brake power booster actuable by means of a push rod to the firewall of an automotive vehicle. An adapter partly surrounds the booster housing and is arranged between the brake booster and the firewall.

It is known that in fixing or mounting arrangements of this type, the adapter which is located between the brake power booster and the firewall of the automotive vehicle affords a correct positioning of the brake power booster in the engine compartment. The effect of sound waves caused by the engine as well those as originating at the moment of ventilation of the brake power booster, which penetrate through the opening provided in the firewall for the actuating push rod of the brake power booster into the passenger compartment. are perceived as disturbing noise by the passengers of the vehicle. A further disadvantage is the undesired penetration of splash water into the passenger compartment through the noted plush rod opening.

It is therefore an object of the present invention to improve an arrangement for the fixation of a brake power booster of the kind mentioned in the beginning in such a manner as to largely eliminate the engine and suction noises of the brake power booster which have a disturbing effect in the passenger compartment of the automotive vehicle and to simultaneously seal the passenger compartment from the engine compartment.

SUMMARY OF THE INVENTION

According to the present invention, this object is achieved in that the adapter is formed with a ventilation port and the push rod opening is sealed by a flexible boot sealed at one end to the firewall or on the periphery of the opening and sealed at its other end to the push rod.

In advantageous further embodiments of the present invention, the seal is constituted by a boot or a rolling boot. These provisions allow therefore the replacement of substitute densely packed filter elements which were previously used for noise abatement in the control housing of the brake power booster by simple filter elements which merely serve to filter the dust. In this way, the response times of the brake power booster are reduced considerably. The filter elements may preferably be positioned between the part of the booster housing which projects into the interior space of the adapter and the inside wall of the adapter.

According to a particularly advantageous embodiment of the invention, it is envisaged that the boot or rolling boot is formed with at least two, preferably with four, ear-like radially outwardly projecting sealing portions which are configurated symmetrically opposite one another and which interact with fixing elements which mount the adapter. This provision affords an effective retainment of the boot or rolling boot during transport, its fixation during mounting as well as an additional seal in the range of the fixing elements.

BRIEF DESCRIPTION OF THE DRAWING

Further details and advantages of the mounting arrangement according to the present invention are set forth in the description of two embodiments of the present invention which are explained in greater detail with reference to the accompanying drawing in which like elements are given like reference numerals and in which:

FIG. 1 illustrates a first embodiment of the mounting arrangement according to the present invention;

FIG. 2 shows a second embodiment of the mounting arrangement according to the present invention;

FIGS. 3 and 4 illustrate details of the seals of FIGS. 1 and 2; and

FIG. 5 shows a variant of the mounting of the seal to the adapter in a diagrammatically simplified illustration in partial longitudinal section.

DETAILED DESCRIPTION

In the embodiment of the present invention shown in FIG. 1, a brake power booster 1 is mounted to a firewall 6 of an automotive vehicle (not shown), an adapter 3 is interposed to whose lefthand end, as viewed in the drawing, brake power booster 1 is secured by means of conventional bolts. At its end facing firewall 6, the adapter 3, which has a ventilation port 7 is mounted on the firewall by at least two, and preferably four, bolts 14 arranged opposite one another which engage corresponding openings in firewall 6 and interact with threaded nuts, (not shown). In this embodiment, the ventilation port 7 which allows a quick ventilation of the brake power booster 1 is formed by a radially positioned radial bore 16 provided in the wall of the adapter 3. A seal 4 is provided between the firewall 6 and the adapter 3 which take the form of a boot 8 in the embodiment illustrated in FIG. 1. This seal is more fully explained in connection with FIGS. 3 and 5. A push rod 5 which is coupled to a brake pedal (not shown) which serves for the actuation of the brake power booster 1 extends through the tapered end of the boot 8 which faces away from the adapter 3 and freely through an opening through firewall 6.

In the embodiment of the present mounting arrangement shown in FIG. 2, the ventilation port 7A is formed by cutouts 15 provided in the area of mounting or structural fixation of the brake power booster 1 to the adapter 3A, and a rolling boot 9 is provided as a seal 4A which rolls on the push rod 5 in the direction of the interior space of the adapter 3A when the brake power booster is actuated. A filter element 18 protecting the interior space of the brake power booster against the penetration of dust particles and the like is arranged within an annular chamber being defined between the inside wall of the adapter 3A and a control housing 21 of the brake power booster 1 positioned in the adapter 3A. At their ends facing away from the brake power booster 1 both of, the embodiments of the seal 4, 4A (boot 8, rolling boot 9) shown in FIGS. 3 and 4 are provided with an annular sealing collar 12, 12A which is, in the assembled condition, sealingly received in a radial groove 13 (FIG. 5) an push rod 5. At their other ends, the FIG. 3 and FIG. 4 embodiments of the seals are furnished with an annular inner flange portion 23 from which at least two, preferably four, projecting portions 19, 19A positioned radially opposite one another project radially outwardly. The portions 19 are provided with passage openings 24, 24A for the bolts 14 of the adapter 3 and apertures 25, 25A which accommodate axial projections 22 (FIG. 5) an the rear flange of the adapter 3 in order to afford a metallic contact between the adapter 3 and the firewall 6 in the assembled configuration. In this way, it is ensured that no torque drop occurs at the bolted connection between the adapter 3 and the firewall 6.

Finally, FIG. 5 shows another mounting of the seal 4, respectively the boot 8B. For this purpose, the boot 8 present, at its end facing the brake power booster 1, a circumferential radial groove 10 into which an radially inwardly projecting annular flange 11 arranged at the adapter 3 is sealed. A plurality of radial webs 26 is provided on the interior space of the boot which ensure a regular conveyance of the air to the brake power booster 1 on actuation of the latter and prevent the seal from being sucked or drawn into the control housing of the brake power booster. In this embodiment, the ventilation port 7B is formed by a throughbore 17 which is at a location 27 of the adapter 3 which has a reduced wall thickness.

What is claimed is:

1. In a brake power booster, a hollow cylindrical adaptor fixed at one end to said booster and including a first flange at its other end fixedly mounting said booster on the front side of a vehicle firewall, said firewall having an opening therethrough opening into said adaptor, said booster including an actuating push rod projecting from said booster freely through said adaptor and said opening in said firewall;

the improvement comprising means defining a ventilation port in said adaptor forwardly of said firewall, and a sealing boot having a radially outwardly projecting sealing flange at one end fixedly and sealingly clamped between said flange of said adapter said firewall around the periphery of said opening in said firewall and annular sealing means at the other end of said boot sealingly received upon said push rod to hermetically seal said opening through said firewall.

2. The invention defined in claim 1, wherein said boot further comprises means defining a radially outwardly opening circumferentially groove in said boot, and a second radially inwardly projecting flange on said adapter seated in said groove.

3. The invention defined in claim 1, wherein said sealing flange comprises an annular inner flange portion and a plurality of diametrically opposed projecting portions projecting outwardly from said inner portions, said projecting portions having bolt passing openings therethrough.

4. The invention defined in claim 3 wherein said projecting portions further include means defining a plurality of apertures therethrough, and a plurality of projections on said first flange of said adaptor projecting through said apertures into contact with said firewall.

5. The invention defined in claim 1, wherein said annular sealing means comprises a resilient annular collar on said boot having a central opening therethrough of a diameter less than the diameter of said push rod, said push rod having an annular groove therein adapted to sealingly receive said central opening in said collar.

6. The invention defined in claim 1 further comprising stiffening webs on the interior of said boot.

* * * * *